(12) United States Patent
Muldowney (10) Patent No.: US 9,618,612 B2
(45) Date of Patent: Apr. 11, 2017

(54) MARKING TANK OBSTRUCTIONS USING AN ELECTRONIC LEVEL GAUGE

(71) Applicant: Honeywell International Inc., Morristown, NJ (US)

(72) Inventor: Mark L. Muldowney, Chalfont, PA (US)

(73) Assignee: Honeywell International Inc., Morristown, NJ (US)

( * ) Notice: Subject to any disclaimer, the term of this patent is extended or adjusted under 35 U.S.C. 154(b) by 285 days.

(21) Appl. No.: 14/622,582

(22) Filed: Feb. 13, 2015

(65) Prior Publication Data
US 2016/0238702 A1    Aug. 18, 2016

(51) Int. Cl.
| G01S 13/88 | (2006.01) |
| G01F 23/284 | (2006.01) |
| G01S 13/10 | (2006.01) |
| G01S 7/41 | (2006.01) |

(52) U.S. Cl.
CPC ............ *G01S 13/10* (2013.01); *G01F 23/284* (2013.01); *G01S 13/88* (2013.01); *G01S 7/41* (2013.01)

(58) Field of Classification Search
CPC ............................... G01F 23/284; G01S 13/88
USPC .......................................................... 342/124
See application file for complete search history.

(56) References Cited

U.S. PATENT DOCUMENTS

| 4,901,083 | A | | 2/1990 | May et al. |
| 5,689,265 | A | * | 11/1997 | Otto .................... G01F 25/0061 340/612 |
| 6,535,161 | B1 | * | 3/2003 | McEwan ............... G01F 23/284 342/118 |
| 7,284,425 | B2 | * | 10/2007 | Wennerberg .......... G01F 23/284 73/290 V |
| 2006/0169055 | A1 | | 8/2006 | Agam et al. |
| 2008/0143583 | A1 | * | 6/2008 | Welle .................... G01F 23/284 342/124 |
| 2009/0158839 | A1 | * | 6/2009 | Spanke ................. G01F 23/284 73/290 V |
| 2010/0162811 | A1 | * | 7/2010 | Malinovskiy ....... G01F 23/2962 73/290 V |
| 2010/0223019 | A1 | * | 9/2010 | Griessbaum .......... G01F 23/284 702/75 |
| 2011/0166805 | A1 | * | 7/2011 | Hammer ............... G01F 23/284 702/55 |
| 2011/0238352 | A1 | * | 9/2011 | Griessbaum ........ G01F 23/2962 702/100 |

(Continued)

*Primary Examiner* — Peter Bythrow
(74) *Attorney, Agent, or Firm* — Jetter & Associates, P.A.

(57) ABSTRACT

An obstruction marking method includes generating a first echo curve using an electronic level gauge (ELG) coupled to a tank from a first reflected signal (echo signal) received when a material in the tank is at a first level. The ELG includes a radar-based obstruction detection algorithm stored in a memory coupled thereto. A processor implementing the obstruction detection algorithm identifies at least a first feature in the first echo curve to provide at least one suspected obstruction along with its position (first feature position). A second echo curve is generated from a second reflected signal when the material is at a second level. A third echo curve is generated from a third reflected signal when the material is at a third level. The suspected obstruction at the first feature position is stored in the memory as a verified obstruction with its first feature position.

19 Claims, 6 Drawing Sheets

(56) References Cited

U.S. PATENT DOCUMENTS

| | | | |
|---|---|---|---|
| 2012/0035867 A1* | 2/2012 | Welle | G01F 23/284 |
| | | | 702/55 |
| 2012/0299768 A1* | 11/2012 | Griessbaum | G01S 7/292 |
| | | | 342/124 |
| 2013/0035880 A1* | 2/2013 | Hoferer | G01F 23/28 |
| | | | 702/55 |
| 2013/0118251 A1* | 5/2013 | Welle | G01F 22/00 |
| | | | 73/290 R |
| 2013/0132005 A1* | 5/2013 | Welle | G01F 23/284 |
| | | | 702/55 |
| 2013/0231877 A1* | 9/2013 | Weber | G01F 23/0061 |
| | | | 702/55 |
| 2014/0047896 A1* | 2/2014 | Griessbaum | G01S 13/103 |
| | | | 73/1.73 |
| 2014/0104099 A1* | 4/2014 | Janitch | G01S 7/4017 |
| | | | 342/124 |
| 2014/0210488 A1* | 7/2014 | Weber | G01F 23/284 |
| | | | 324/644 |
| 2014/0214361 A1* | 7/2014 | Bartov | G01F 23/2962 |
| | | | 702/167 |
| 2015/0084809 A1* | 3/2015 | Flasza | G01F 23/284 |
| | | | 342/124 |

* cited by examiner

MARKING TANK OBSTRUCTIONS USING AN ELECTRONIC LEVEL GAUGE

FIELD

Disclosed embodiments relate to methods and systems that provide marking of tank obstructions using an electronic level gauge.

BACKGROUND

An electronic level gauge (ELG) utilizing radar is commonly used in industry as part of a guided-wave radar (GWR) or non-contact radar (NCR) system to measure the amount (e.g., level) of material (liquid or bulk solid (e.g., powder)) in a tank or a storage tank. An ELG provides continuous level (volume) measurement of high reliability at a generally reasonable price. The reliability is obtained due to lack of moving parts and insensitivity of the measurements to changes in process pressure, temperature, and density of measured material.

The ELG for GWR or NCR is mounted on top of the tank and measures the distance from a reference point, usually a mounting flange at the top of the antenna to the surface of the product material in the tank using reflection of the measuring signal from the surface of the product material. The product level value is obtained by subtracting the measured distance from a total height of the tank.

Tanks can include a variety of obstacles or obstructions in the path of the radar between the ELG and the surface of the measured material in the tank. For example, obstructions such as ladders, pipes or pumps may be mounted inside the tank. Because the obstructions can interfere with the radar signal reflected from the surface of the measured material in the tank, inaccurate level measurements can result. An obstruction is any internal non-product item in the tank or other object in the path of the measurement signal or close to the signal path of the measurement signal.

SUMMARY

This Summary briefly indicates the nature and substance of this Disclosure. It is submitted with the understanding that it will not be used to interpret or limit the scope or meaning of the claims.

Disclosed embodiments recognize conventional non-contact radar (NCR) and sometimes guided-wave radar (GWR) applications require that the tank upon which the electronic level gauge (ELG) instrument is being installed be emptied so that all obstructions in the tank are revealed and then marked as obstructions in the echo curve of the ELG. This is recognized herein as being impractical particularly on large tanks, and at best an inconvenience during commissioning/installation of the ELG.

Instead of emptying the tank to find obstructions, a disclosed obstruction finding method can be used during normal tank operations. As an emptying tank reveals features that do not move with the product level as the level goes below them, disclosed ELG firmware provides a radar-based obstruction detection algorithm (obstruction detection algorithm) which can automatically log the position of these features as they appear. In the future as the product level in the tank increases, the feature log can be used to verify that these same feature points disappear or fade as the level passes through them in the opposite direction. Once this behavior is verified in both directions, these points can be shown in the echo curve as "learned obstructions" via normal process operations, so that it is no longer needed to empty the product in the tank during initial startup. The known obstruction location(s) identified along with a level history and real time positive/negative level rate of change (stored in memory) can be used as input to a radar-based level detection algorithm (level detection algorithm) to avoid false level readings caused by internal tank features, as the level in the tank approaches these obstructions in future tank operations.

One disclosed embodiment is an obstruction marking method for radar-based level finding including NCR and GWR. The method includes generating a first echo curve using an ELG coupled to a tank from a first reflected signal (echo signal) received when a material in the tank is at a first level. The ELG includes a transceiver and a processor implementing a radar level algorithm stored in an associated non-transitory memory (memory) coupled thereto.

The obstruction detection algorithm identifies at least a first feature in the first echo curve to provide at least one suspected obstruction along with its position (first feature position). A second echo curve is generated from a second reflected signal when the material is at a second level in the tank that passes through the first feature position so that an amplitude of the second reflected signal at the first feature position is above its amplitude in the first reflected signal. A third echo curve is generated from a third reflected signal when the material is at a third level in the tank that is above the first level sufficiently so that an amplitude of the third reflected signal at the first feature position is below its amplitude in the first reflected signal. The suspected obstruction is identified as a verified obstruction located at the first feature position and is stored in the memory.

Disclosed embodiments also include systems for marking obstructions in a tank using radar-based level finding. The system includes an ELG coupled to the tank including a transceiver and a processor implementing an obstruction detection algorithm and level detection algorithm stored in an associated non-transitory memory (memory) coupled thereto. The obstruction detection algorithm generates a first echo curve from a first reflected signal received when a material in the tank is at a first level, and identifies at least a first feature in the first echo curve to provide at least one suspected obstruction along with its position (first feature position). A second echo curve is generated from a second reflected signal when the material is at a second level in the tank that passes through the first feature position so that an amplitude of the second reflected signal at the first feature position is above its amplitude in the first reflected signal. A third echo curve is generated from a third reflected signal when the material is at a third level in the tank that is above the first level sufficiently so that an amplitude of the third reflected signal at the first feature position is below its amplitude in the first reflected signal. The suspected obstruction is identified as a verified obstruction located at the first feature position and is stored in the memory.

The verified obstruction can be used by the ELG during tank operations while employing a radar-based level detection algorithm (level detection algorithm), wherein the level detection algorithm automatically utilizes the verified obstruction with its position in calculating a material level. This is in contrast to known practice which involves a user manually entering obstruction information during startup if known, or emptying the tank and measuring the position(s) of obstructions.

Disclosed embodiments methods, systems and computer program products which for obstruction detection and level detection utilize timing measurements and calculations that are performed in time durations on the order of a few Pico ($10^{-12}$) seconds, corresponding to the time it takes electromagnetic pulses to travel a few meters, with a timing resolution of 0.001 meter (=3.3 Pico seconds). Because of the speed and timing requirements, these measurements and calculations clearly cannot be performed by a human.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
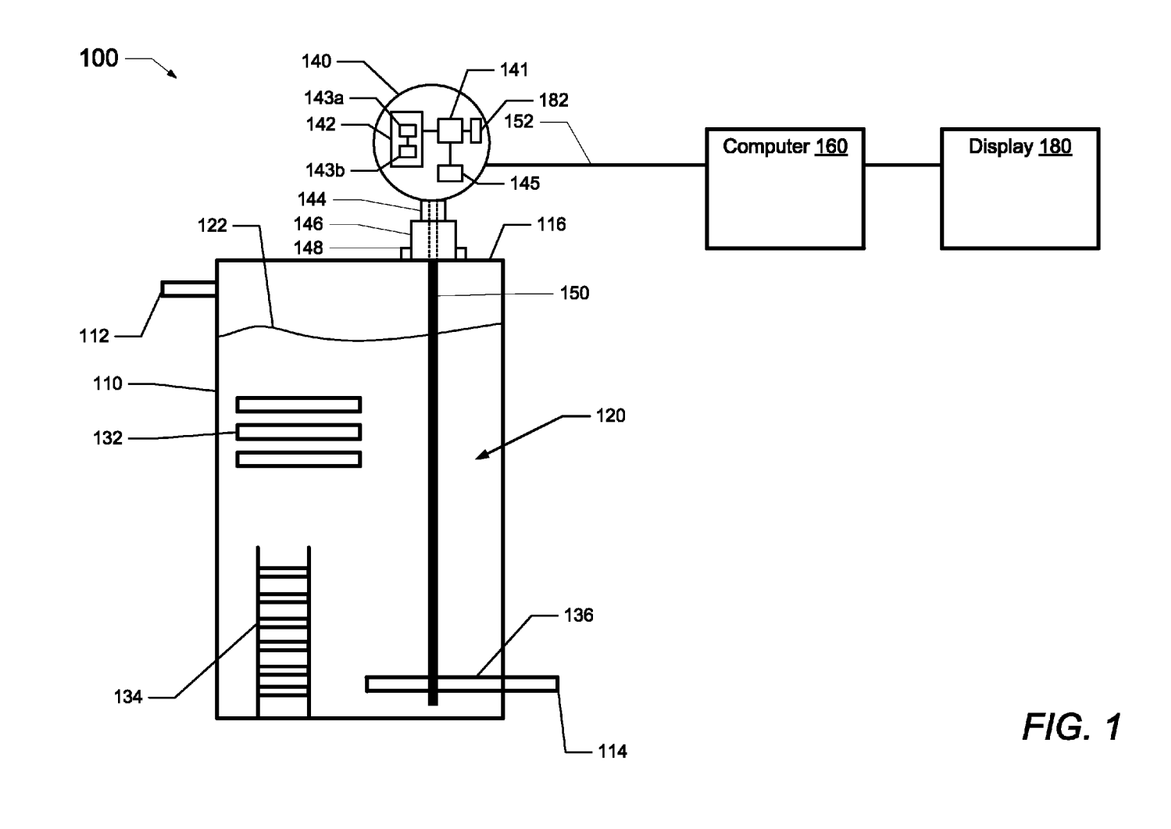
FIG. 1 is a block diagram of an example ELG system mounted to a tank for measuring the level of a material in the tank using GWR, according to an example embodiment.

FIG. 1 illustrates an example tank-based system 100 including an example ELG 140 implementing GWR. System 100 can be used in a variety of manufacturing plants that handle and process a tangible material. In one embodiment, system 100 can be used in a petroleum refinery. In another embodiment, system 100 can be used in a grain processing and shipping facility. The system 100 includes a tank 110 that contains a liquid or other material 120 (liquid or bulk solid (e.g., powder)). The tank has an inlet 112 and an outlet 114. The liquid or other material 120 fills the tank 110 to an upper level or surface 122. Several example obstacles or obstructions are shown located within tank 110 including heater coils 132, ladder 134 and outlet pipe 136. An ELG 140 such as a radar level gauge is mounted to the top 116 of tank 110.

ELG 140 provides continuous level (volume) measurement for the liquid or other material 120 of high reliability at a generally reasonable price. The reliability is obtained due to lack of moving parts and insensitivity of the measurements to changes in process pressure, temperature, and density of measured material. The ELG 140 includes a level detection algorithm which measures the distance from a reference point, usually a mounting flange at the top of the antenna (or waveguide) to the surface of the product material in the tank using reflection of the measuring signal from the level or surface 122 of the liquid or other material 120.

ELG 140 as shown is mounted to the top 116 of the tank 110 by coaxial connector 144, feed-through 146, and flange 148 that couple the ELG 140 to a waveguide 150 which is inserted over a tank aperture (not shown) in the top 116 of the tank 110. As shown, waveguide 150 extends well into the liquid or other material 120 in the tank 110, such as to implement GWR. ELG 140 is shown including a transceiver 145 (which as used herein can include a separate transmitter and receiver), a computing device such as a processor 141 (e.g., digital signal processor (DSP), microprocessor or microcontroller unit (MCU)) having an associated memory 142 that stores a disclosed obstruction detection algorithm 143a and a level detection algorithm 143b as firmware. ELG 140 including a local display 182. Other electronics, such as signal amplifiers, filters, an analog-to-digital converter (ADC, in the receive circuitry) and digital-to-analog converter (DAC, in the transmit circuitry) are generally part of ELG 140, but are not shown to provide simplicity.

ELG 140 is shown coupled to a remote computer 160 having a display 180 (such as being a control room of a plant) via a cable (e.g., electrical cable) 152. Coupling between ELG 140 and computer 160 may also be accomplished wirelessly. For GWR applications, waveguide 150 extends to essentially the bottom of the tank 110 or to a portion of the tank (if only a portion of the tank needs to be measured). The measurement signal propagates along waveguide 150 to the material and then is reflected back to ELG 140.

ELG 140 can transmit electrical signals representative of the distance from the top 116 of tank 110 to the level of liquid or other material 120 in the tank 110 to the processor 141. Processor 141 can perform any one or more of the methods, processes, operations, applications, or methodologies described herein. For example, processor 141 can implement the level detection algorithm 143b from digitized versions of received electrical signals resulting from the reflected electromagnetic signals (echo signals) received by the transceiver 145 representative of the measured distance from the top of tank to the level of liquid or other material, and using a stored total height of the tank 110 can calculate the material level by subtracting the measured distance from the total height of the tank 110.

Figure 2:
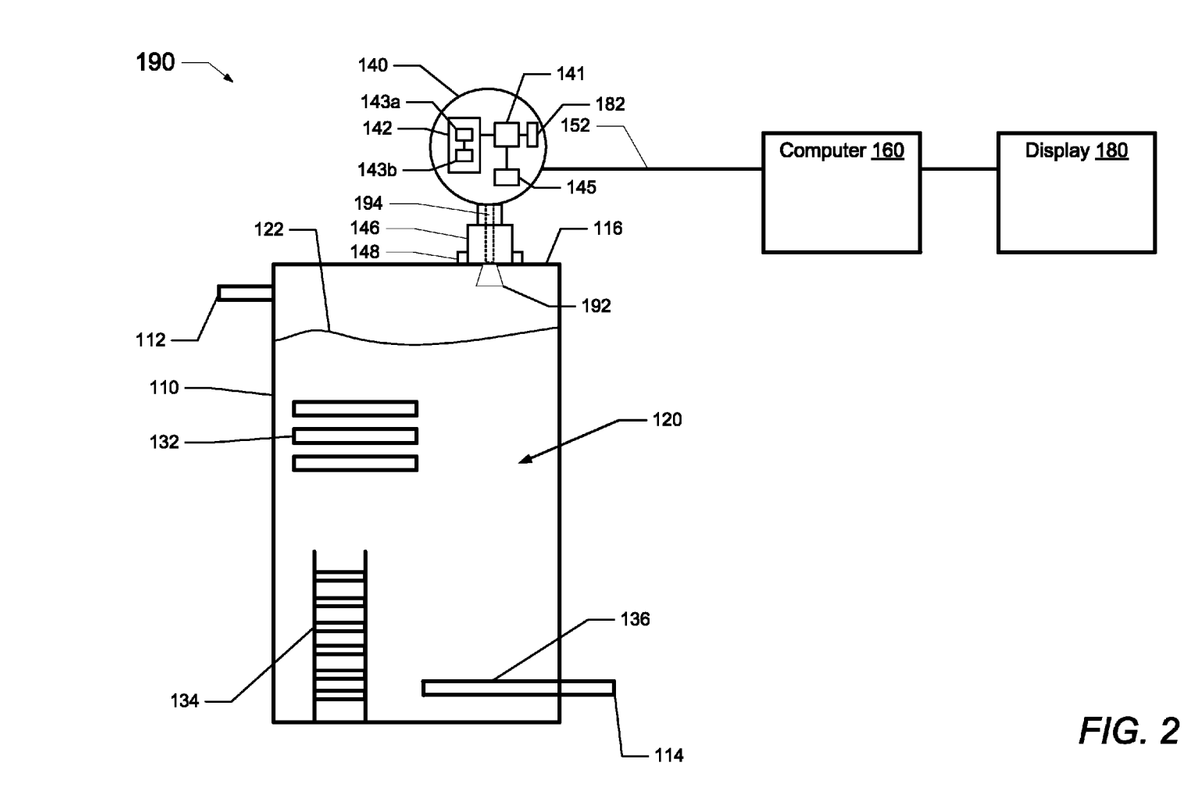
FIG. 2 is a block diagram of an example ELG system mounted to a tank for measuring the level of a material in the tank using NCR, according to an example embodiment.

FIG. 2 illustrates another example tank-based system 190 implementing NCR. System 190 is similar to system 100 except that waveguide 150 has been replaced by an antenna shown as a horn antenna 192 and the coaxial connector 144 has been replaced by a waveguide 194. For implementing the obstruction detection algorithm 143*a* and level detection algorithm 143*b* the horn antenna 192 transmits electromagnetic pulses generated by the transceiver 145, and the transceiver 145 receives reflected signals from reflected electromagnetic signals (echo signals) reflected from the level or surface 122 received by horn antenna 192. The ELG 140 for NCR measures the distance from a reference point, such as the horn antenna 192 to the surface of the product material in the tank 110 using reflection of the measuring signal from the level or surface 122 of the liquid or other material 120.

For NCR applications, horn antenna 192 extends into tank 110 by only a relatively short distance. The measuring signal is propagated from horn antenna 192 through free-space (air or other gas in the tank) and the liquid or other material 120 in the tank.

Figure 3:
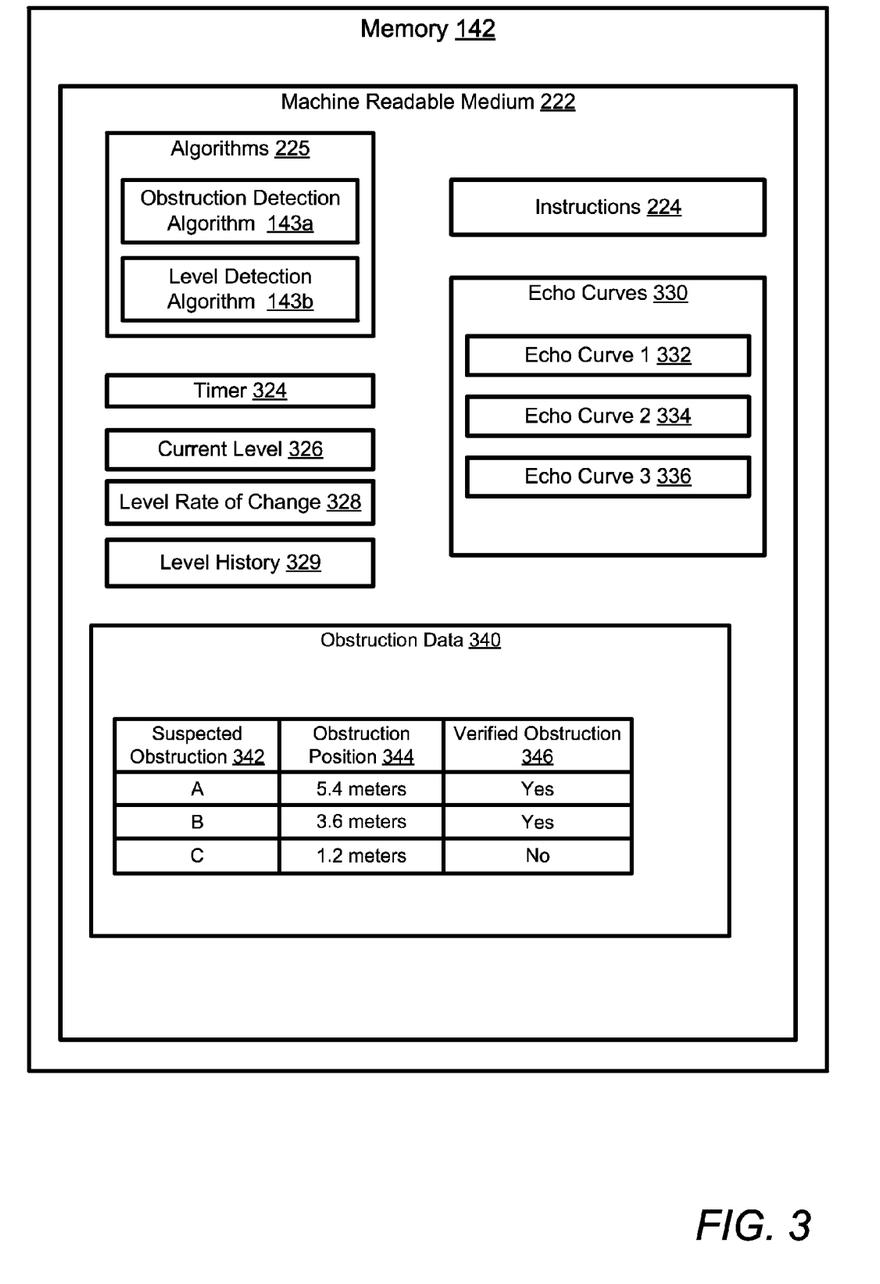
FIG. 3 is an example illustration of contents of a computer readable storage medium stored on a memory, according to an example embodiment.

With reference to FIG. 3, example contents of machine-readable medium 222 stored within memory 142 are shown. Machine-readable medium 222 can store instructions 224 and/or algorithms 225 for execution by processor 141.

Machine-readable medium 222 further includes obstruction detection algorithm 143*a*, level detection algorithm 143*b*, timer 324, current level 326, level rate of change 328, level history 329 and echo curves 330. Level detection algorithm 143*b* executing on processor 141 can determine the current level 326 of material in tank 110. Obstruction detection algorithm 143*a* causes processor 141 to generate echo curves from the reflected signals received when a material in the tank is at a different level. Processor 141 identifies features in the echo curves to provide at least one suspected obstruction along with its position.

Timer 324 tracks a pre-determined period of time to generate echo curves 330. Current level 326 is the current level 122 of liquid or other material 120 in tank 110. Level rate of change 328 is the positive and negative change rate of level 122 as tracked by processor 141 as the tank 110 filled and emptied. Level history 329 is the level 122 tracked by processor 141 over a period of time. Echo curves 330 are graphs of received reflected electromagnetic pulses versus position or height within tank 110. Echo curves 330 include echo curve 1 332, echo curve 2 334 and echo curve 3 336.

Obstruction data 340 includes suspected obstructions 342 and obstruction positions 344 within tank 110. If processor 141 verifies that the suspected obstruction is a verified obstruction, the suspected obstruction is marked as a verified obstruction 346.

Figure 4:
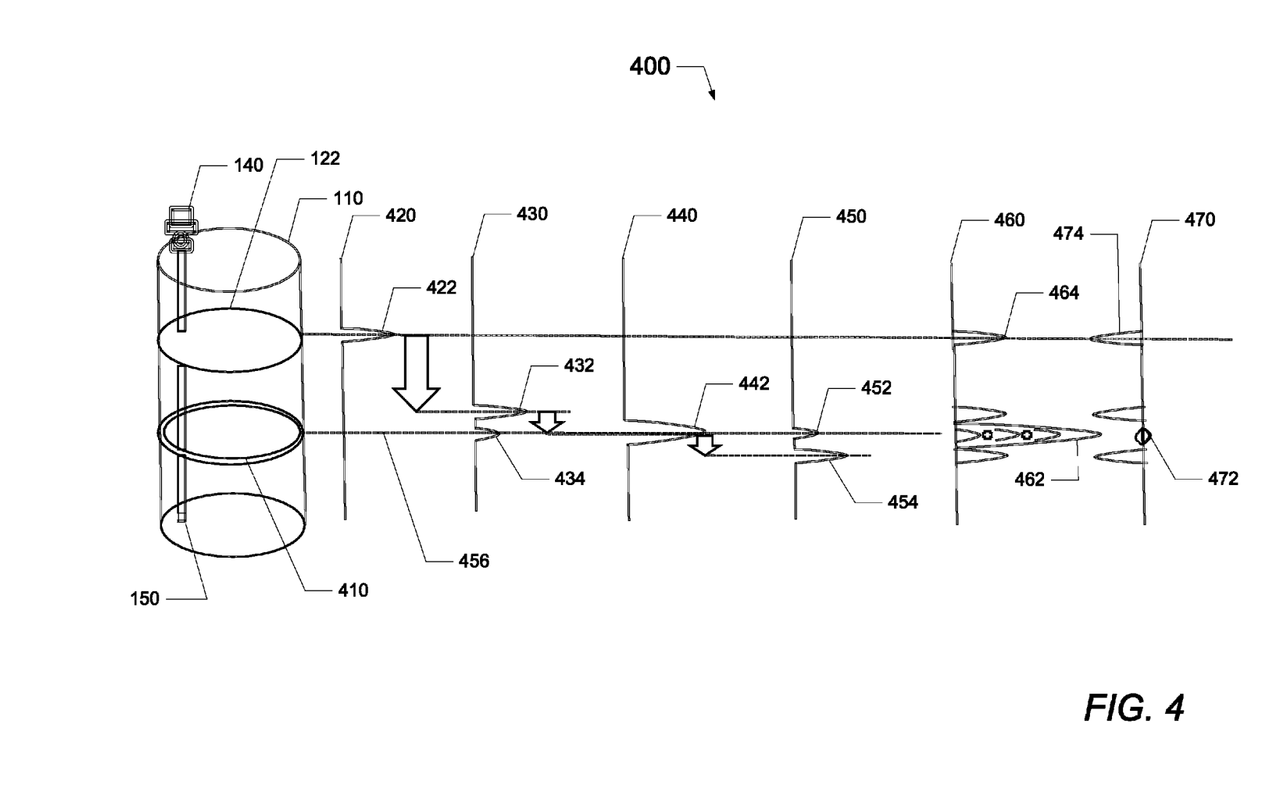
FIG. 4 illustrates a depiction of echo curves generated by an ELG system using GWR as the level of the material in the tank increases and decreases, according to an example embodiment.

FIG. 4 illustrates a depiction of echo curves 400 generated by ELG 140 using GWR as the level 122 of the material in the tank 110 increases and decreases. The echo curves are the result of processing received reflected electromagnetic pulses. When the level 122 is above an obstruction 410, an initial echo curve 420 is generated. Echo curve 420 has an amplitude peak 422 corresponding to the level 122 of material in tank 110. As the level 122 decreases in tank 110 and approaches obstruction 410, echo curve 430 is generated. Echo curve 430 has an amplitude peak 432 corresponding to the level 122 of material in tank 110 and an amplitude peak 434 corresponding to the position of obstruction 410.

As the level 122 continues to decreases in tank 110 and is at the same position as obstruction 410, echo curve 440 is generated. Echo curve 440 results from the constructive interference of reflections from both level 122 and obstruction 410 resulting in a higher and wider amplitude peak. Echo curve 440 has an amplitude peak 442 corresponding to both the level 122 of material in tank 110 and to the position of obstruction 410.

As the level 122 continues to decreases in tank 110 and is below the position of obstruction 410, echo curve 450 is generated. Echo curve 450 has an amplitude peak 452 corresponding to the position of obstruction 410 and an amplitude peak 454 corresponding to the level 122 of material in tank 110. It is noted that the vertical position 456 of obstruction 410 on the echo curves does not change. As the level 122 of material decreases and increases passing through the obstruction 410 in tank 110, processor 141 executing obstruction detection algorithm 143*a* can determine and record the vertical position 456 of the obstruction 410.

In one embodiment, processor 141 executing obstruction detection algorithm 143*a* can sum or add echo curves 420, 430, 440 and 450 to generate a resulting summed echo curve 460. Summed echo curve 460 has an amplitude peak 462 corresponding to the position of obstruction 410 and an amplitude peak 464 corresponding to the level 122 of material in tank 110. Amplitude peak 462 has a large amplitude resulting from the sum of amplitude peaks 434, 442 and 452. Processor 141 executing obstruction detection algorithm 143*a* can verify the vertical position 456 of the obstruction 410 using amplitude peak 462.

In another embodiment, processor 141 obstruction detection algorithm 143*a* can subtract echo curves 420, 430, 440 and 450 to generate a resulting subtracted echo curve 470. Subtracted echo curve 470 has an amplitude peak 472 corresponding to the position of obstruction 410 and an amplitude peak 474 corresponding to the level 122 of material in tank 110. Amplitude peak 474 has minimum amplitude resulting from the subtraction of amplitude peaks 434, 452 and 442. Processor 141 executing obstruction detection algorithm 143*a* can verify the vertical position 456 of the obstruction 410 using amplitude peak 472.

Figure 5A:
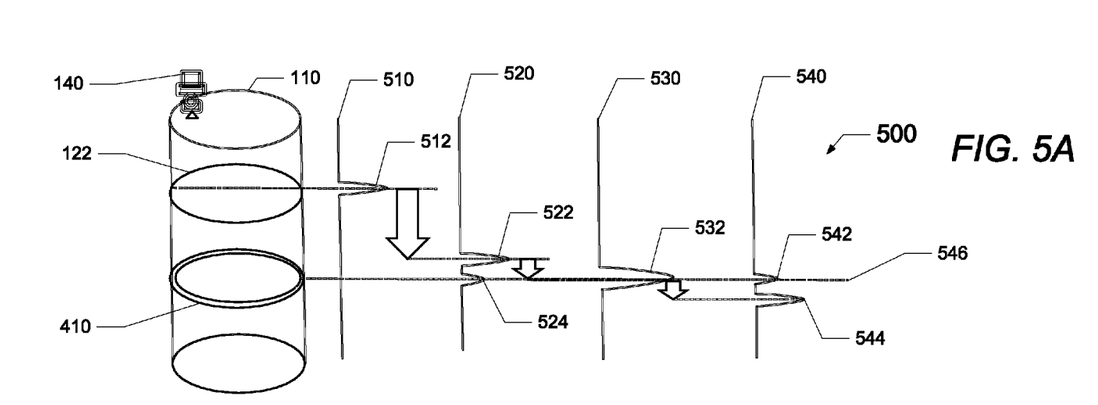
FIG. 5A illustrates a depiction of echo curves generated by an ELG system using NCR as the level of the material in the tank decreases, according to an example embodiment.

FIG. 5A illustrates a depiction of echo curves 500 generated by an ELG 140 using NCR as the level 122 of the material in the tank 110 decreases. The echo curves are the result of received reflected electromagnetic pulses. When the level 122 is above an obstruction 410, an initial echo curve 510 is generated. Echo curve 510 has an amplitude peak 512 corresponding to the level 122 of material in tank 110. As the level 122 decreases in tank 110 and approaches obstruction 410, echo curve 520 is generated. Echo curve 520 has an amplitude peak 522 corresponding to the level 122 of material in tank 110 and an amplitude peak 524 corresponding to the position of obstruction 410.

As the level 122 continues to decreases in tank 110 and is at the same position as obstruction 410, echo curve 530 is generated. Echo curve 530 results from the constructive interference of reflections from both level 122 and obstruction 410 resulting in a higher and wider amplitude peak. Echo curve 530 has an amplitude peak 532 corresponding to both the level 122 of material in tank 110 and to the position of obstruction 410.

As the level 122 continues to decrease in tank 110 and is below the position of obstruction 410, echo curve 540 is generated. Echo curve 540 has an amplitude peak 542 corresponding to the position of obstruction 410 and an amplitude peak 544 corresponding to the level 122 of material in tank 110. It is noted that the vertical position 546 of obstruction 410 on the echo curves does not change. As the level 122 of material decreases passing by or through the obstruction 410 in tank 110, processor 141 executing obstruction detection algorithm 143a can determine and record the vertical position 546 of the obstruction 410.

Figure 5B:
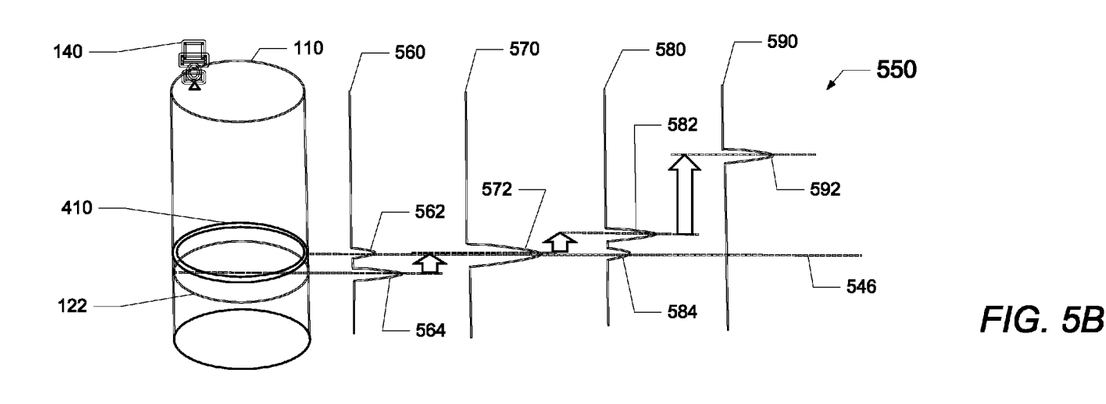
FIG. 5B illustrates a depiction of echo curves generated by an ELG system using NCR as the level of the material in the tank increases, according to an example embodiment.

FIG. 5B illustrates a depiction of echo curves 550 generated by an ELG 140 using NCR as the level 122 of the material in the tank 110 increases. The echo curves are the result of received reflected electromagnetic pulses. When the level 122 is below obstruction 410, echo curve 560 is generated. Echo curve 560 has an amplitude peak 562 corresponding to obstruction 410 and amplitude peak 564 corresponding to the level 122 of material in tank 110.

As the level 122 increases in tank 110 and is at the same position as obstruction 410, echo curve 570 is generated. Echo curve 570 results from the constructive interference of reflections from both level 122 and obstruction 410 resulting in a higher and wider amplitude peak. Echo curve 570 has an amplitude peak 572 corresponding to both the level 122 of material in tank 110 and to the position of obstruction 410.

As the level 122 continues to increase in tank 110 and is above the position of obstruction 410, echo curve 580 is generated. Echo curve 580 has an amplitude peak 582 corresponding to the level 122 of material in tank 110 and an amplitude peak 584 corresponding to the vertical position 546 of obstruction 410. As the level 122 of material increases further above obstruction 410 in tank 110, echo curve 590 is generated. Echo curve 590 has an amplitude peak 592 corresponding to the level 122 of material in tank 110. The amplitude peak corresponding to the vertical position 546 of obstruction 410 has disappeared from echo curve 590. As the level 122 of material increases above obstruction 410 in tank 110 and the amplitude peak at vertical position 546 disappears, processor 141 executing obstruction detection algorithm 143a can determine and record the vertical position 546 of the obstruction 410 as a verified obstruction.

Figure 6:
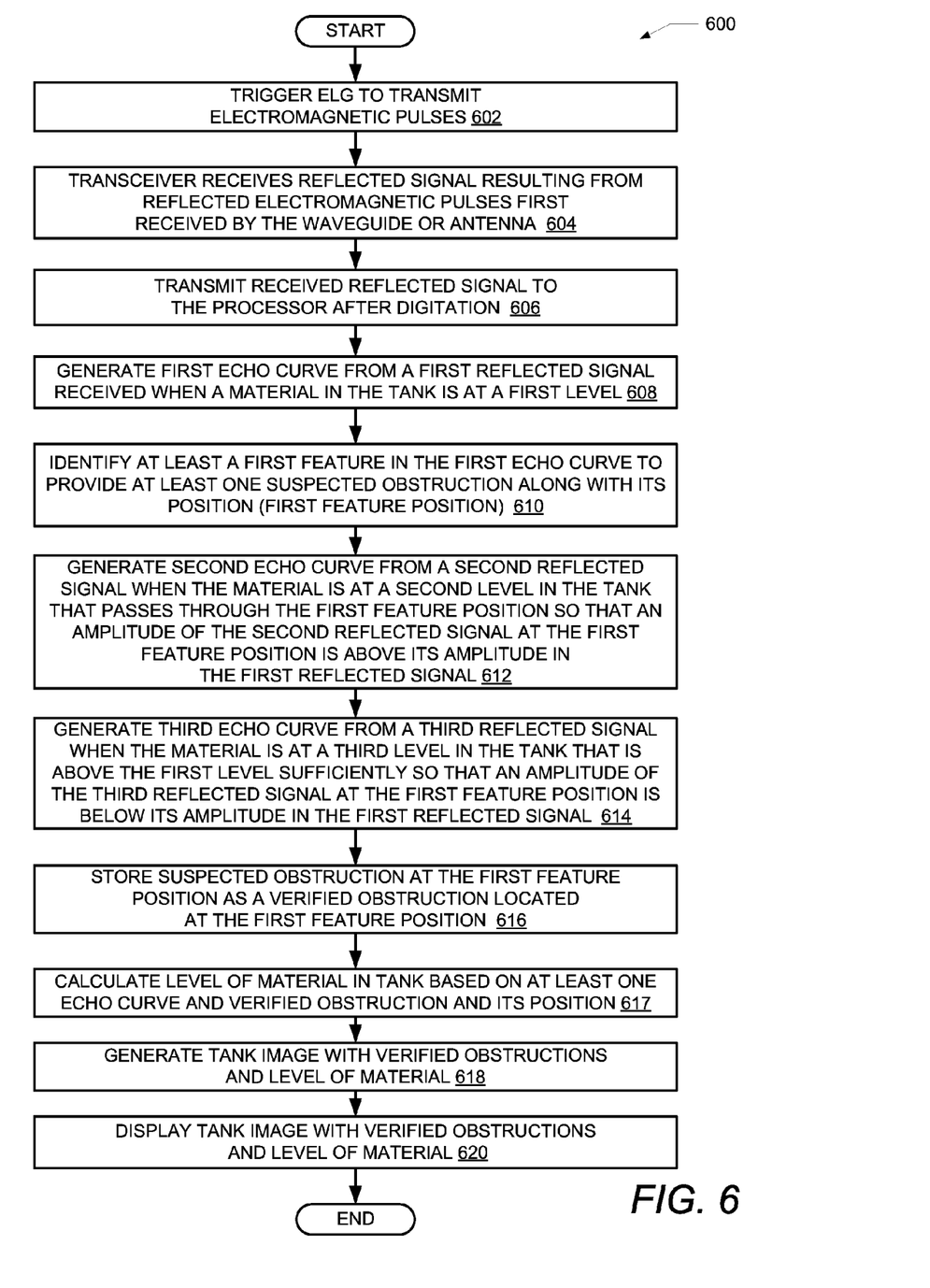
FIG. 6 is a flow chart that shows steps in an example method of marking of tank obstructions in a tank, according to an example embodiment.

FIG. 6 is a flow chart of an example method 600 of marking of tank obstructions such as obstruction 410 in tank 110. Method 600 can be implemented via the execution of instructions 224 and/or algorithms 225 by processor 141. More specifically, method 600 can be implemented via the execution of obstruction detection algorithm 143a by processor 141. Method 600 begins at the start block and proceeds to block 602 where processor 141 triggers ELG 140 to transmit electromagnetic pulses from either waveguide 150 (FIG. 1) or horn antenna 192 (FIG. 2). The transceiver 145 of ELG 140 receives a reflected signal resulting from reflected electromagnetic pulses first received by the waveguide or antenna (block 604 and transmits the received reflected signal to the processor 141 after digitation (block 606.

At block 608, processor 141 generates a first echo curve (e.g. echo curve 510) from a first reflected signal received when a material in the tank is at a first level. Processor 141 identifies at least a first feature in the echo curve 540 to provide at least one suspected obstruction 410 along with its vertical position 546 (first feature position) (block 610). Processor 141 generates a second echo curve 540 from a second reflected signal when the material is at a second level in the tank that passes through the vertical position 546 (first feature position) so that an amplitude peak 542 of the second reflected signal at the first feature position is above its amplitude peak 544 in the first reflected signal (block 612).

Processor 141 generates a third echo curve 530 from a third reflected signal when the material is at a third level in the tank that is above the first level sufficiently so that an amplitude peak 532 of the third reflected signal at the vertical position 546 (first feature position) is below its amplitude in the first reflected signal (block 614). Processor 141 stores the suspected obstruction 410 at the vertical position 546 (first feature position) to memory 142 as a verified obstruction 346 located at the vertical position 546 (first feature position) (block 616). In one embodiment, the current level 326, the level rate of change 328 and level history 329 over a period of time are used as inputs to the obstruction detection algorithm 143a to determine verified obstruction 346 The verified obstruction(s) 346 and its feature position 546 are stored in memory 142.

As noted above, the verified obstruction(s) 346 and its feature position 546 stored in memory 142 can be used by the ELG during tank operations when using a level detection algorithm, wherein the level detection algorithm automatically utilizes the verified obstruction 346 with its feature position 546 along with a level history 329 and real time positive/negative level rate of change 328, (block 617) in calculating a material level to avoid false level readings caused by internal tank features when calculating the level 122 of the material in tank 110. This is in contrast to known practice which involves a user manually entering obstruction information during startup if known, or emptying the tank and measuring the position(s) of obstruction(s). Computer 160 or processor 141 can generate an image of the tank 110 including the verified obstructions located at the feature positions and the current level 326 of material in the tank (block 618), and can display the image on display 180 and/or 182 (block 620). Method 600 then ends.

As noted above, instead of conventionally emptying the tank 110 of all the product material therein to find obstructions therein, disclosed method 600 can be used during normal tank operations. As an emptying tank reveals features 410 that do not move with the level 122 as the level goes below them, it is recognized and obstruction detection algorithm 143a executing on processor 141 can log or store in memory 142 the vertical position (546, 456) of these features as they appear, so that in the future as the product level in the tank increases, the feature log can be used to verify that these same feature points disappear or fade as the level passes through them in the opposite direction, and once this behavior is verified in both directions, these points can be shown in the echo curve as verified obstructions 346. Method 600 thus avoids the need to empty the liquid or other material 120 in tank 110 during initial startup.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. An obstruction marking method for radar-based level finding, comprising:
   generating a first echo curve using an electronic level gauge (ELG) coupled to a tank from a first reflected signal received when a material in said tank is at a first level, said ELG including a transceiver coupled to a processor implementing a radar-based obstruction detection algorithm (obstruction detection algorithm) stored in an associated non-transitory memory (memory) coupled thereto, said obstruction detection algorithm:
      identifying at least a first feature in said first echo curve to provide at least one suspected obstruction along with its position (first feature position);
      generating a second echo curve from a second reflected signal when said material is at a second level in said tank that passes through said first feature position so that an amplitude of said second reflected signal at said first feature position is above its an amplitude at said first feature position in said first reflected signal;
      generating a third echo curve from a third reflected signal when said material is at a third level in said tank that is above said first level sufficiently so that an amplitude of said third reflected signal at said first feature position is below its amplitude in said first reflected signal;
      identifying said suspected obstruction as a verified obstruction being located at said first feature position, and
      storing said verified obstruction with said first feature position in said memory.

2. The method of claim 1, further comprising:
   summing said first echo curve, said second echo curve and said third echo curve to generate a combined echo curve; and
   identifying within said combined echo curve at least one peak amplitude.

3. The method of claim 2, wherein said at least one peak amplitude corresponds to said suspected obstruction at said first feature position.

4. The method of claim 1, further comprising:
   subtracting said first echo curve, said second echo curve and said third echo curve from each other to generate a combined echo curve; and
   identifying from said first, second, third and combined echo curves at least one minimum amplitude.

5. The method of claim 4, wherein said minimum amplitude corresponds to said verified obstruction at said first feature position.

6. The method of claim 1, further comprising:
   level finding by said ELG during operation of said tank using a radar-based level detection algorithm (level detection algorithm), wherein said level detection algorithm automatically utilizes said verified obstruction with said first feature position in calculating a material level.

7. An electronic level gauge (ELG) for coupling to a tank, comprising:
   a transceiver coupled to a processor implementing a radar-based obstruction detection algorithm (obstruction detection algorithm) and a radar-based level detection algorithm (level detection algorithm) both stored in an associated non-transitory memory (memory) coupled thereto, said obstruction detection algorithm causing said processor to:
      generate a first echo curve from a first reflected signal received when a material in said tank is at a first level;
      identify at least a first feature in said first echo curve to provide at least one suspected obstruction along with its position (first feature position);
      generate a second echo curve from a second reflected signal when said material is at a second level in said tank that passes through said first feature position so that an amplitude of said second reflected signal at said first feature position is above its amplitude in said first reflected signal;
      generate a third echo curve from a third reflected signal when said material is at a third level in said tank that is above said first level sufficiently so that an amplitude of said third reflected signal at said first feature position is below its amplitude in said first reflected signal; and
      store said suspected obstruction and said first feature position in said memory as a verified obstruction along with said first feature position.

8. The ELG of claim 7, wherein said obstruction detection algorithm further causes said processor to:
   sum said first echo curve, said second echo curve and said third echo curve to generate a combined echo curve; and
   identify within said combined echo curve at least one peak amplitude.

9. The ELG of claim 8, wherein said at least one peak amplitude corresponds to said suspected obstruction at said first feature position.

10. The ELG of claim 7, wherein said obstruction detection algorithm further causes said processor to:
    subtract said first echo curve, said second echo curve and said third echo curve from each other to generate a combined echo curve; and
    identify from said first, second, third and combined echo curves at least one minimum amplitude.

11. The ELG of claim 10, wherein said minimum amplitude corresponds to said verified obstruction at said first feature position.

12. The ELG of claim 7, wherein said level detection algorithm causes said processor to:
    level find during operation of said tank, wherein said level detection algorithm automatically utilizes said verified obstruction with said first feature position in calculating a material level.

13. A computer program product, comprising:
    a non-transitory data storage medium that includes program instructions executable by a processor to enable said processor to execute a method for marking obstructions in a tank using radar-based level finding, wherein said tank has an electronic level gauge (ELG) including a transceiver, and wherein a radar-based obstruction detection algorithm (obstruction detection algorithm) is stored in said non-transitory data storage medium, said computer program product comprising:
       code for generating a first echo curve from a first reflected signal received when a material in said tank is at a first level;
       code for identifying at least a first feature in said first echo curve to provide at least one suspected obstruction along with its position (first feature position);
       code for generating a second echo curve from a second reflected signal when said material is at a second level in said tank that passes through said first feature position so that an amplitude of said second reflected signal at said first feature position is above its amplitude in said first reflected signal;

code for generating a third echo curve from a third reflected signal when said material is at a third level in said tank that is above said first level sufficiently so that an amplitude of said third reflected signal at said first feature position is below its amplitude in said first reflected signal; and code for storing said suspected obstruction at said first feature position in said non-transitory data storage medium as a verified obstruction located at said first feature position.

14. The computer program product of claim 13, wherein said computer program product further comprises:

code for summing said first echo curve, said second echo curve and said third echo curve to generate a combined echo curve; and code for identifying within said combined echo curve at least one peak amplitude.

15. The computer program product of claim 14, wherein said at least one peak amplitude corresponds to said suspected obstruction at said first feature position.

16. The computer program product of claim 13, wherein said computer program product further comprises:

code for subtracting said first echo curve, said second echo curve and said third echo curve from each other to generate a combined echo curve; and code for identifying from said first, second, third and combined echo curves at least one minimum amplitude.

17. The computer program product of claim 16, wherein said minimum amplitude corresponds to said verified obstruction at said first feature position.

18. The computer program product of claim 13, wherein said computer program product further comprises:

code for generating an image of said tank including said verified obstruction located at said first feature position; and code for displaying said image on a display.

19. The computer program product of claim 13, wherein said computer program product further comprises code for a radar-based level detection algorithm including code for utilizing said verified obstruction with said first feature position in calculating a material level.

* * * * *